Patented Oct. 10, 1950

2,524,986

UNITED STATES PATENT OFFICE 2,524,986

COMPOSITE MATERIAL AND METHOD OF MAKING

James McBride, Brookville, Ohio, assignor, by mesne assignments, to Adrian P. Bock, Dayton, Ohio No Drawing. Application March 28, 1946, Serial No. 657,889

11 Claims. (Cl. 260—17.3)

This invention relates to a new plastic-cellulose composite material and a method of making it.

It is an object of this invention to prepare a plastic-cellulose composite material which is of uniform character throughout.

It is an object of this invention to prepare a new plastic-cellulose composite material which requires relatively small quantities of chemicals and thus may be produced at a relatively low price.

It is another object of this invention to produce a composite material which—after stresses causing dimensional changes have ceased—recovers its original shape and size just as completely as rubber materials do.

It is another object of this invention to provide composite materials with physical properties differing widely over a large range by merely varying the proportions of the ingredients.

It is thus another object of this invention to provide composite materials which may be either compounded so as to yield a product of an unusually high degree of hardness or one of a very low degree of hardness and good workability.

It is another object of this invention to provide a composite material which may be proportioned either so as to yield a product of a very high density and high strength or so as to have a very low density.

It is still another object of this invention to provide a composite material of so low a density that it is usable as sound-proofing material.

It is still another object of this invention to provide a composite material which has a very high structural strength, and in particular has high impact strength, high flexural strength, high tensile strength and high compression strength.

It is still another object of this invention to provide a composite material which has excellent color stability.

It is still another object of this invention to provide a composite material which shows a high degree of water resistance.

It is still another object of this invention to provide a composite material which has a low inflammability and consequently a high fire resistance.

It is still another object of this invention to provide a composite material that has a high resistance to heat.

It is still another object of this invention to provide a composite material which has good heat insulating properties.

It is still another object of this invention to provide a composite material that has a high resistance to acids.

It finally is also an object to this invention to provide a composite material that has a high electrical resistivity, a high dielectrical constant and a low electrical loss factor.

These and other objects are accomplished by compounding a mixture of a urea-formaldehyde condensation product, a crystalline acid, a cellulose material and so much of an additional acid as to adjust the pH to a value smaller than 7 but not beyond 3 and curing the mixture thus obtained. It was found that by adjusting the pH of the mixture to the acid side, but preferably to a value of from 3 to 4, the optimum being at approximately 4, a more complete reaction of the ingredients during curing and consequently a more uniform product is obtained.

All urea-formaldehyde resins and condensation products are suitable for my invention; however, the substance giving by far the best results is dimethylolurea.

It was also found that during curing the additional ingredients associated with some of the cellulose materials for instance the cobs of corn develop furfural which react with the resin ingredients; the furfural thus can substitute for part of the resinous ingredients proper. Consequently the quantity of the resinous ingredients may be reduced which again entails a reduction of the price of the material, dimethylolurea and other urea-formaldehyde condensation products being relatively expensive, in particular with regard to the cellulose materials usable.

For adjusting the pH of the mixture any inorganic or organic acid, that is substantially water-free, such as sulfuric acid, chromic acid, salicylic acid, and many others may be used; however, salicylic acid was found preferable.

As the cellulosic material, alpha-cellulose materials were found especially suitable. From these again, corn cobs, wood flour, sawdust, corn stalks, straw, hay and cotton stalks proved highly satisfactory; they had the further advantage of being inexpensive, as they are plentifully available as waste materials.

As the acid which is to enter the reaction and form the condensation product with the dimethylolurea, all crystalline acids are suitable; however, organic crystalline acids are preferred. Phenol and oxalic acid yielded the best results, and from these again phenol was preferred.

In the following Table I, a number of examples are given of the products of my invention. There the abbreviation Sal. designates salicylic acid.

In grading the samples of Examples I, II and III, the following designations were used: 1 for superior, 2 for very good, 3 for good, 4 for average, 5 for fair, 6 for poor, 7 for very poor and 8 for unsatisfactory.

*Table I*

|  | Ex. I | Ex. II | Ex. III |
|---|---|---|---|
| *Composition* | | | |
| Acid for Controlling pH, in Per Cent | 1.1 Sal. | 0.58 Sal. | 0.32 Sal. |
| Urea in Per Cent | | | |
| Formaldehyde in Per Cent | | | |
| Dimethylolurea in Per Cent | 48.48 | 27.96 | 15.2 |
| Condensation Acid | 2.02 Phenol | 1.17 Phenol | 0.64 Phenol |
| Corn Cobs | 48.49 | 70.29 | 83.84 |
| *Physical Properties* | | | |
| Impact Strength | 2 | 4 | 6 |
| Flexural Strength | 2 | 2 | 5 |
| Tensile Strength | 1 | 1 | 5 |
| Compression Strength | 1 | 1 | 5 |
| Hardness | 1 | 4 | 6 |
| Color Stability | 1 | 1 | 2 |
| Water Resistance | 1 | 3 | 5 |
| Fire Resistance | 1 | 2 | 2 |
| Inflammability | 8 | 7 | 6 |
| Heat Resistance | 2 | 2 | 2 |
| Heat Insulation | 3 | 2 | 1 |
| Acoustical Properties | 6 | 5 | 2 |
| Dielectric Strength | 1 | 3 | 2 |
| El. Loss Factor | 6 | 6 | 6 |
| Stability of Form | 2 | 2 | 2 |
| Specific Gravity | 1 | 3 | 5 |
| Resistivity | 2 | 2 | 2 |
| Acid Resistance | 1 | 2 | 4 |
| Workability | 5 | 3 | 3 |

It will be seen from this table that all compositions consist of the same ingredients and merely proportions thereof have been varied, Example I having the highest amount of dimethylolurea and the lowest amount of cellulosic filler material. The products of Examples I, II and III were tested as to their physical properties and the values obtained compared with those obtainable with an imaginary "ideal plastic" which would yield optimal results in the determination of all physical properties. It will be seen that Example I yielded the product of the greatest hardness, whereas Example III yielded a solidly bonded but relatively soft material. It was found by absolute measurements that the hardness of Example I tested with a ¼" ball and a load of 1000 kg. was 103 Rockwell. A sample of the product of Example I was in fact as hard to drill as one of the hardest steels. As the constituents of the material are varied from Formula I to Formula III, the hardness of the material reduces. Likewise the density becomes lower and the product of Formula III is relatively soft and porous which makes it suitable par excellence for sound-proofing boards and other materials of definite acoustical properties.

The products of Examples I, II and III were also tested as to some of their physical absolute values, and Table II compiles the results of these determinations.

thoroughly mixed and finally dried to a moisture content of not more than 4%. Thereafter the mixture is placed into a mold. The mold is heated in a high frequency electrostatic field to a temperature of from 280° to 450° F. for a time of 20 to 300 seconds, and at the same time a pressure of from 1000 to 6000 p. s. i. is exerted onto the mixture. The preferred heating temperature is 315° F., and the pressure range preferred is from 2500 to 3000 p. s. i. It will be understood that the pressure is dependent to a certain degree upon the purpose for which the material is to be used, a pressure of more than 3000 p. s. i. yielding a product of increased density and consequently of high structural strength and a pressure of below 2500 p. s. i. yielding a product of reduced density which is desirable in the case that the product is to be employed for acoustical purposes.

It is important that the mass be heated instantaneously throughout the entire thickness. This is preferably realized by applying high frequency electrostatic energy. In the case that boards or sheets are to be manufactured from the composition of the invention, it was found advantageous to alternate in the mold layers of approximately 0.5" thickness with sheet electrodes. A current frequency of 4.5 megacycles was found suitable in this case.

It is also of utmost importance that heat and pressure are applied simultaneously.

The tolerance of the mold should not exceed 0.010". The mold is advantageously made with rounded corners and insulated with a material of a high dielectrical constant. For articles which are to contact metal parts when in use, stainless steel is preferred as the material of the molds. It is important for obtaining a uniform material that the ingredients are thoroughly mixed and that the pressure is uniformly applied.

The adjustment of the mixture, prior to molding, may be carried out—as described above—by adding the proper amount of an acid. However, it is also feasible to add an excess of acid and then neutralize by the addition of an alkaline compound so much of the acid as to obtain the acidity desired. It was set forth above that with a pH of approximately 4 the best results are obtained.

If desired, coloring matter may be added to the ingredients whereby a colored product is obtained. This may be done by immersing the filler material, which has been previously ground so as to pass through a 16-mesh screen, into a solution of dye material and thereafter drying the impregnated filler to a moisture content of 4% or less. It is advantageous, though not compulsory, to apply vacuum during the immersion step; likewise, the moisture in excess of 4% may be removed by applying vacuum with or without heat.

The following example demonstrates an especially suitable method for the production of a colored material: To 73 parts by weight of water

*Table II*

|  | Example I | Example II | Example III |
|---|---|---|---|
| Compression Strength | 10,380 p. s. i. | 9,450 p. s. i. | 7,880 p. s. i. |
| Flexural Strength on 5" Span | 483 p. s. i. | 628 p. s. i. | 510 p. s. i. |
| Tensile Strength | 3,830 p. s. i. | 4,840 p. s. i. | 3,520 p. s. i. |
| Impact Strength with Izod test 5/16" x 5/16" notched bar | 0.51 foot lbs. per inch of notch | 0.81 | 0.60. |
| Hardness with ¼" ball & 1000 kg. load | 103 Rockwell | 60 Rockwell | 53 Rockwell. |
| Water absorption after immersion of 24 hrs | 0.00% | 0.005% | 0.10%. |

In order to manufacture the products of my invention the ingredients are first ground so as to pass an 80- to 100-mesh screen; then they are heated to a temperature of from 120° to 150° F., 10 parts by weight of urea, 15 parts by weight of dimethylolurea and 2 parts by weight of salicylic acid are added and dissolved; thereafter the coloring material is added and dissolved. The coarsely ground filler material is then immersed and vacuum is applied whereby it is impregnated with the solution. The moisture is removed from the separated impregnated filler until the content is as low as 4% or less. This dried material is then ground to the fineness required for the production of the composite material of my invention, which is to a fineness so as to pass through an 80- to 100-mesh screen. This material is then used in the described manner instead of the plain cellulosic filler material for composing the mixture of my invention.

The product and process of my invention is also usable for cementing several layers of veneer to each other, whereby a novel construction material is obtained. In this case, veneer sheets, which may range from 0.050 to 0.125" thickness, are immersed and impregnated with a solution similar to that described in connection with the ground filler material. Drying to a moisture content of 4% or less is also performed in the manner set forth above. The pretreated veneer sheets are then placed into the molds and a molding compound of or similar to any of the Formulas I to III is added. After curing, a uniform product is obtained which is characterized by a high-strength bond between the layers.

In case that the material is to be used for purposes where light and heat reflection are important, the material may be coated with aluminum. For this purpose the mold was lined with aluminum powder in a thickness varying from 0.002 to 0.031" prior to filling it with the molding ingredients proper. The product obtained after curing in a mold lined with aluminum powder showed a shiny metallic surface.

It will be understood that while there have been described herein certain specific embodiments of my invention, it is not intended thereby to have it limited thereto or circumscribed by the specific details of procedure, proportions, materials and conditions set forth in view of the fact that this invention is susceptible to modifications which come within the spirit of this disclosure and the scope of the appended claims.

I claim:

1. A method of making a composite plastic-wood material consisting of blending from approximately 48 to 84 parts by weight of natural cellulosic material approximately 15 to 50 parts by weight of dimethylolurea and approximately 0.64 to 2 parts by weight of an acid selected from the group consisting of phenol and oxalic acid the quantity of acid increasing with increases in quantity of dimethylolurea, all compounds being in substantially dry condition, and curing said mixture thus obtained under the influence of heat and pressure whereby a condensation reaction takes place.

2. A method of making a composite plastic-wood material consisting of blending from approximately 48 to 84 parts by weight of comminuted corn cobs approximately 15 to 50 parts by weight of dimethylolurea and approximately 0.64 to 2 parts by weight of an acid selected from the group consisting of phenol and oxalic acid all compounds being in substantially dry condition and the quantity of acid increasing with increases in quantity of dimethylolurea, and curing said mixture thus obtained under the influence of heat and pressure whereby a condensation reaction takes place.

3. A method of making a composite plastic-wood material consisting of blending from approximately 48 to 84 parts by weight of comminuted corn cobs approximately 15 to 50 parts by weight of dimethylolurea and approximately 0.64 to 2 parts by weight of phenol all compounds being in substantially dry condition and the quantity of phenol increasing with increases in quantity of dimethylolurea, and curing said mixture thus obtained under the influence of heat and pressure whereby a condensation reaction takes place.

4. A method of making a composite plastic-wood material consisting of blending from approximately 48 to 84 parts by weight of comminuted corn cobs approximately 15 to 50 parts by weight of dimethylolurea and approximately 0.64 to 2 parts by weight of oxalic acid, all compounds being in substantially dry condition and the quantity of oxalic acid increasing with increases in quantity of dimethylolurea, and curing said mixture thus obtained under the influence of heat and pressure whereby a condensation reaction takes place.

5. A method of making a composite plastic-wood material consisting of blending 48 to 84 parts of comminuted natural cellulosic material, 15 to 50 parts of dimethylolurea, 0.64 to 2 parts of crystalline acid selected from the group consisting of phenol and oxalic acid the quantity of acid increasing with increases in quantity of dimethylolurea, adding to the blend approximately 0.3 to 1.2 parts by weight of salicyclic acid to catalyze the condensation reaction, all compounds being in substantially dry condition, and curing said mixture thus obtained under the influence of heat and pressure whereby a condensation reaction takes place.

6. A method of making a composite plastic-wood material consisting of blending from approximately 48 to 84 parts by weight of natural cellulosic material approximately 15 to 50 parts by weight of dimethylolurea and approximately 0.64 to 2 parts by weight of an acid selected from the group consisting of phenol and oxalic acid the quantity of acid increasing with increases in quantity of dimethylolurea, all compounds being in substantially dry condition, and curing the mixture thus obtained at a temperature in the range of 280 to 450° F. and a pressure in the range of 1000 to 6000 pounds per square inch whereby a condensation reaction takes place.

7. A method of making a composite plastic-wood material consisting of blending from approximately 48 to 84 parts by weight of natural cellulosic material approximately 15 to 50 parts by weight of dimethylolurea and approximately 0.64 to 2 parts by weight of an acid selected from the group consisting of phenol and oxalic acid the quantity of acid increasing with increases in quantity of dimethylolurea, all compounds being in substantially dry condition, and curing the mixture thus obtained at a temperature of approximately 315° F. and a pressure in the range of 2500 to 3000 pounds per square inch whereby a condensation reaction takes place.

8. A new composition of matter consisting of 48 to 84 parts by weight of comminuted natural cellulosic material and a condensation product obtained from 0.64 to 2 parts by weight of crystalline acid selected from the group consisting of phenol and oxalic acid and 15 to 50 parts by weight of dimethylolurea, the quantity of acid increasing with increases in quantity of dimethylolurea.

9. A new composition of matter consisting of 48 to 84 parts by weight of comminuted natural cellulosic material and a condensation product obtained from 0.64 to 2 parts by weight of phenol and 15 to 50 parts by weight of dimethylolurea, the quantity of acid increasing with increases in quantity of dimethylolurea.

10. A new composition of matter consisting of 48 to 84 parts by weight of comminuted natural cellulosic material and a condensation product obtained from 0.64 to 2 parts by weight of oxalic acid and 15 to 50 parts by weight of dimethylolurea, the quantity of acid increasing with increases in quantity of dimethylolurea.

11. A new composition of matter consisting of 48 to 84 parts by weight of comminuted corn cobs and a condensation product obtained from 0.64 to 2 parts by weight of crystalline acid selected from the group consisting of phenol and oxalic acid and 15 to 50 parts by weight of dimethylolurea, the quantity of acid increasing with increases in quantity of dimethylolurea.

JAMES McBRIDE.

REFERENCES CITED

The following references are of record in the file of this patent:

UNITED STATES PATENTS

| Number | Name | Date |
| --- | --- | --- |
| 43,666 | Burchardt | Aug. 2, 1864 |
| 1,756,252 | Lougovoy | Apr. 29, 1930 |
| 1,922,690 | Lougovoy | Aug. 15, 1933 |
| 2,007,987 | Sussenguth | July 16, 1935 |
| 2,192,129 | Ellis | Feb. 27, 1940 |
| 2,342,037 | Cremer | Feb. 15, 1944 |
| 2,357,950 | Goessling | Sept. 12, 1944 |
| 2,373,362 | Walter | Apr. 10, 1945 |

FOREIGN PATENTS

| Number | Country | Date |
| --- | --- | --- |
| 479,250 | Great Britain | Feb. 2, 1938 |